(12) United States Patent
Okano

(10) Patent No.: US 8,843,072 B2
(45) Date of Patent: Sep. 23, 2014

(54) SENSING WIRELESS TERMINAL

(75) Inventor: Hideo Okano, Hanno (JP)

(73) Assignee: Olympus Corporation, Tokyo (JP)

( * ) Notice: Subject to any disclaimer, the term of this patent is extended or adjusted under 35 U.S.C. 154(b) by 136 days.

(21) Appl. No.: 13/489,141

(22) Filed: Jun. 5, 2012

(65) Prior Publication Data

US 2012/0315862 A1 Dec. 13, 2012

(30) Foreign Application Priority Data

Jun. 7, 2011 (JP) .................................. 2011-127552

(51) Int. Cl.
*H04B 7/00* (2006.01)
*H04W 8/00* (2009.01)
*H04W 4/22* (2009.01)

(52) U.S. Cl.
CPC ................ *H04W 4/22* (2013.01); *H04W 8/005* (2013.01)
USPC ............................ 455/66.1; 455/41.2; 455/39

(58) Field of Classification Search
USPC .............. 455/41.2, 41.3, 66.1, 39; 340/539.1, 340/539.12, 539.24, 539.26, 539.3
See application file for complete search history.

(56) References Cited

U.S. PATENT DOCUMENTS

| 7,736,319 | B2 * | 6/2010 | Patangay et al. | ............... 600/528 |
| 2008/0300659 | A1 * | 12/2008 | Matos | ............................. 607/60 |
| 2009/0199713 | A1 | 8/2009 | Asprion et al. | |
| 2010/0268303 | A1 * | 10/2010 | Mitchell et al. | ................. 607/60 |
| 2012/0221068 | A1 * | 8/2012 | Ellingson | ......................... 607/17 |
| 2012/0313760 | A1 * | 12/2012 | Okano | ......................... 340/10.1 |

FOREIGN PATENT DOCUMENTS

| JP | 2002-102362 A | 4/2002 |
| JP | 2009-247812 A | 10/2009 |
| JP | 2009-537299 A | 10/2009 |

* cited by examiner

*Primary Examiner* — Lewis West
(74) *Attorney, Agent, or Firm* — Westerman, Hattori, Daniels & Adrian, LLP

(57) ABSTRACT

A sensing wireless terminal may include a sensor unit having at least two sensing modes, a wireless communication unit configured to wirelessly transmit sensing data corresponding to a signal sensed by the sensor unit to another terminal, the wireless communication unit receiving control data transmitted from the other terminal, and a control unit configured to determine whether or not to change a mode from a first mode to a second mode based on the signal sensed by the sensor unit, the control unit determining whether or not to change the mode from the second mode to the first mode based on the control data received by the wireless communication unit, wherein, comparing the two sensing modes of the sensor unit, a mode having a relatively long sensing interval is defined as the first mode and a mode having a relatively short sensing interval is defined as the second mode.

4 Claims, 6 Drawing Sheets

SENSING WIRELESS TERMINAL

BACKGROUND OF THE INVENTION

1. Field of the Invention

The present invention relates to a sensing wireless terminal.

Priority is claimed on Japanese Patent Application No. 2011-127552, filed Jun. 7, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the fields of medicine and health care, there has been an increased effort to collect biological data from the surface of a human body or the inside of the body using a terminal provided with various sensors, transmit the biological data collected by the terminal to a storage device for storage, and use the biological data stored in the storage device for health management, disease diagnosis, medical treatment and the like. For this purpose, if the terminal is connected to the storage device using a wired cable in order to transmit the biological data, since the freedom of movement is limited, it is preferable to transmit the biological data through wireless communication, and to drive the terminal using a battery such that a user can freely carry the terminal. These needs are significantly increased in the medical field, particularly, for an implantable medical device (IMD).

Furthermore, the IMD generally operates with power from a battery. Accordingly, when the battery is exhausted and its voltage is reduced, battery exchange is required. Since the battery exchange of the IMD requires surgery, which causes a large burden to a patient and may generate adverse effects such as an infection, it is desirable to minimize the consumption of the battery.

Furthermore, in the IMD, a sensor generally detects emergency information, and a transfer destination or a transfer method of the emergency content is changed according to the level of emergency of the detected emergency information. Furthermore, after the sensor detects the emergency information, the IMD continuously transmits the biological data to the storage device. In this case, since the battery is consumed too quickly, an IMD capable of switching between two modes, that is, an operation mode of continuously transmitting the biological data and an operation mode of stopping the transmission of the biological data, has been disclosed (for example, refer to Japanese Unexamined Patent Application, First Publication No. 2002-102362).

In technology disclosed in Japanese Unexamined Patent Application, First Publication No. 2002-102362, an IMD or a storage device performs determination regarding whether to switch the operation mode of continuously transmitting the biological data to the operation mode of stopping the transmission of the biological data, or determination regarding whether to switch the operation mode of stopping the transmission of the biological data to the operation mode of continuously transmitting the biological data.

SUMMARY

The present invention provides a sensing wireless terminal capable of reducing the probability of missing an opportunity in an emergency while suppressing power consumption.

A sensing wireless terminal may include: a sensor unit having at least two sensing modes; a wireless communication unit configured to wirelessly transmit sensing data corresponding to a signal sensed by the sensor unit to another terminal, the wireless communication unit receiving control data transmitted from the other terminal; and a control unit configured to determine whether or not to change a mode from a first mode to a second mode based on the signal sensed by the sensor unit, the control unit determining whether or not to change the mode from the second mode to the first mode based on the control data received by the wireless communication unit, wherein, comparing the two sensing modes of the sensor unit, a mode having a relatively long sensing interval is defined as the first mode and a mode having a relatively short sensing interval is defined as the second mode.

If it is determined that the mode is changed from the first mode to the second mode, then the control unit may control the wireless communication unit to transmit a signal to the other terminal, wherein the signal activates a communication unit provided in the other terminal.

According to the present invention, the sensor unit has at least two sensing modes. Furthermore, the wireless communication unit transmits sensing data corresponding to a signal sensed by the sensor unit to another wireless terminal in a wireless manner, and receives control data transmitted from the other terminal. Furthermore, comparing the two sensing modes of the sensor unit with each other, when a mode having a relatively long sensing interval is defined as a first mode and a mode having a relatively short sensing interval is defined as a second mode, the control unit determines whether to change the mode from the first mode to the second mode based on the signal sensed by the sensor unit, and determines whether to change the mode from the second mode to the first mode based on the control data received by the wireless communication unit.

Thus, since it is possible for the determination unit to perform the switching from the mode having a relatively long sensing interval to the mode having a relatively short sensing interval based on the signal sensed by the sensor unit, it is possible to perform switching to the mode having a relatively short sensing interval more quickly. Furthermore, since the determination unit performs the switching from the mode having a relatively short sensing interval to the mode having a relatively long sensing interval based on the control data received by the wireless communication unit, it is not necessary to analyze the sensed signal and it is possible to further reduce power consumption. Consequently, it is possible to reduce the probability of missing an opportunity in an emergency while suppressing power consumption.

BRIEF DESCRIPTION OF THE DRAWINGS

The above features and advantages of the present invention will be more apparent from the following description of certain preferred embodiments taken in conjunction with the accompanying drawings, in which.

Figure 5:
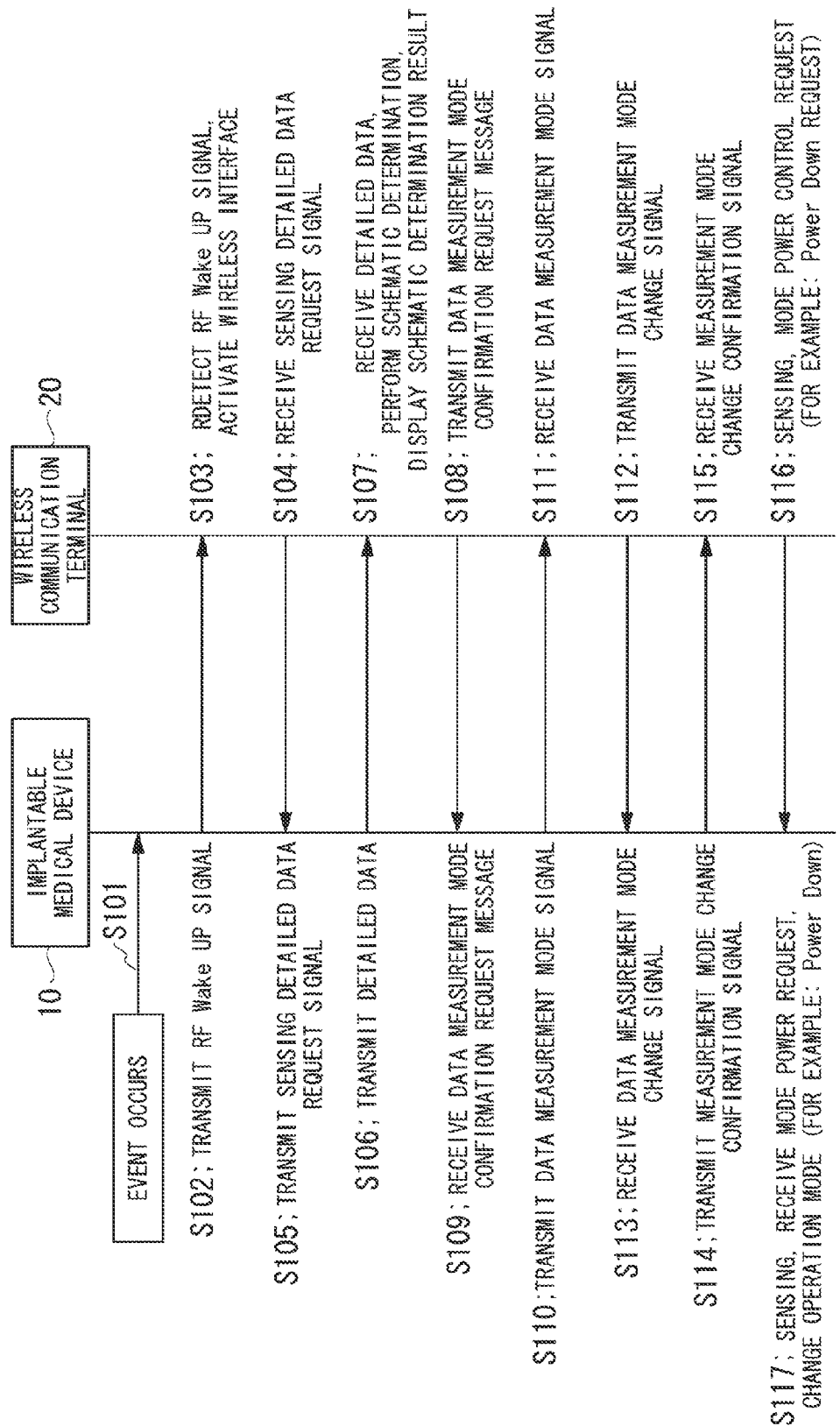
Figure 6:
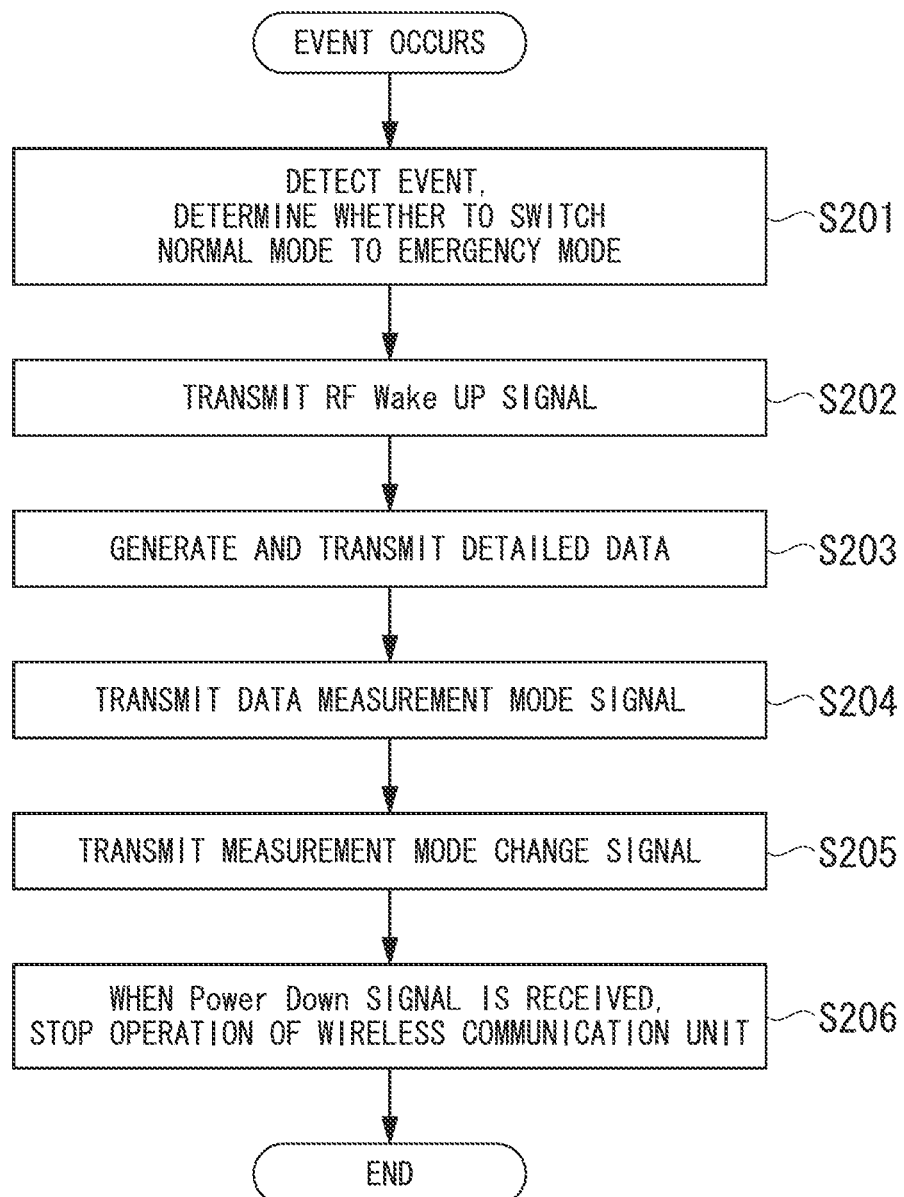
Figure 7:
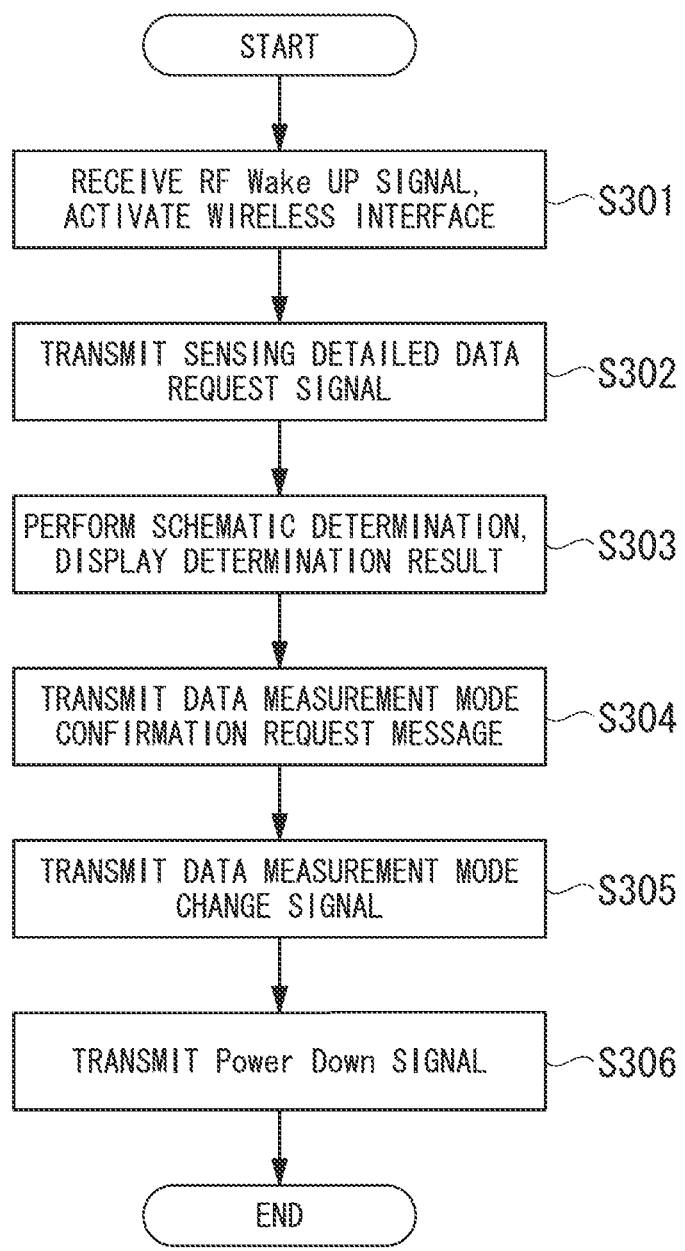

FIG. 5 is a sequence diagram illustrating the operation procedures of the IMD 10 and the wireless communication terminal 20 in accordance with the first preferred embodiment of the present invention;

FIG. 6 is a flowchart illustrating the operation procedure of the IMD 10 in accordance with the first preferred embodiment of the present invention; and FIG. 7 is a flowchart illustrating the operation procedure of the wireless communication terminal 20 in accordance with the first preferred embodiment of the present invention.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
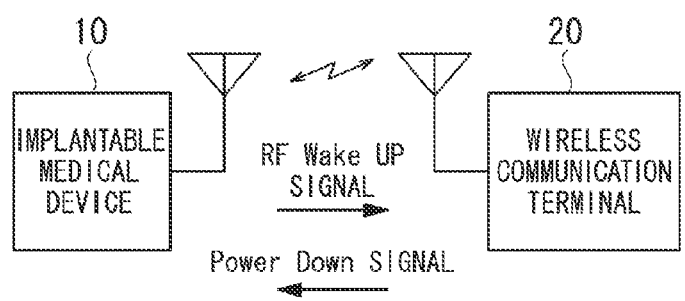
FIG. 1 is a schematic diagram illustrating the configuration of a biological data monitoring system in accordance with the first preferred embodiment of the present invention.

Hereinafter, a first preferred embodiment of the present invention will be described with reference to the accompanying drawings. FIG. 1 is a schematic diagram illustrating the configuration of a biological data monitoring system in accordance with the first preferred embodiment of the present invention. A biological data monitoring system 1 includes an implantable medical device (IMD) 10 (a sensing wireless terminal) and a wireless communication terminal 20 (another terminal). In the first preferred embodiment, the IMD 10 and the wireless communication terminal 20 wirelessly communicate with each other in a one-to-one manner.

The IMD 10 is implanted inside of a human body to acquire biological data, such as blood pressure, pulse, electrocardiograph, heartbeat, blood oxygen level, body temperature, glycosuria, or blood sugar, or device status data, which indicates the statuses of units provided in the IMD 10, using various sensors. In the first preferred embodiment, the biological data and the device status data will be referred to as detailed data (sensing data).

Furthermore, the IMD 10 operates in one of two modes, that is, a normal mode (a first mode) and an emergency mode (a second mode). In the normal mode, the IMD 10, for example, acquires the detailed data once a day or once every 12 hours. Furthermore, in the normal mode, the IMD 10 does not transmit the detailed data to the wireless communication terminal 20. In the emergency mode, the IMD 10, for example, acquires the detailed data every five seconds. Furthermore, in the emergency mode, the IMD 10 transmits the detailed data to the wireless communication terminal 20. As described above, a sensing interval in the normal mode is relatively longer than a sensing interval in the emergency mode.

Furthermore, based on the acquired detailed data, the IMD 10 performs an emergency level determination process of determining whether to change the operation mode of the IMD 10 from the normal mode to the emergency mode. When it is determined that the operation mode is changed from the normal mode to the emergency mode, the IMD 10 changes the operation mode to the emergency mode and performs a process corresponding to the emergency mode. In detail, the IMD 10 acquires the detailed data every 10 seconds. Furthermore, the IMD 10 transmits an RF Wake UP signal to the wireless communication terminal 20, and then transmits the detailed data to the wireless communication terminal 20, wherein the RF Wake UP signal activates a wireless interface (a communication unit provided in the other terminal) of the wireless communication terminal 20.

Furthermore, when a measurement mode change signal serving as an instruction to change the operation mode of the IMD 10 from the emergency mode to the normal mode is received from the wireless communication terminal 20, the IMD 10 changes the operation mode from the emergency mode to the normal mode, and performs a process corresponding to the normal mode. In detail, the IMD 10 acquires the detailed data every minute. Furthermore, the IMD 10 stops the transmission of the detailed data to the wireless communication terminal 20. Furthermore, when a Power Down signal instructing to stop the operation of a wireless communication unit has been received from the wireless communication terminal 20, the IMD 10 stops the operation of the wireless communication unit.

When the RF Wake UP signal transmitted from the IMD 10 has been received, the wireless communication terminal 20 activates the wireless communication interface to prepare to receive the detailed data. Furthermore, after activating the wireless communication interface, the wireless communication terminal 20 receives the detailed data transmitted from the IMD 10, and stores the detailed data in a storage unit.

Furthermore, based on the received detailed data, the wireless communication terminal 20 performs a schematic determination process of determining whether to change the operation mode of the IMD 10 from the emergency mode to the normal mode. Details of the schematic determination process will be described later. Then, when it is determined that the operation mode of the IMD 10 is changed from the emergency mode to the normal mode, the wireless communication terminal 20 transmits a data measurement mode change signal for instructing a change from the emergency mode to the normal mode. Furthermore, when it is determined that the operation mode of the IMD 10 is changed from the emergency mode to the normal mode, the wireless communication terminal 20 transmits the Power Down signal to the IMD 10, wherein the Power Down signal instructs to stop the operation of the wireless communication unit of the IMD 10.

Figure 2:
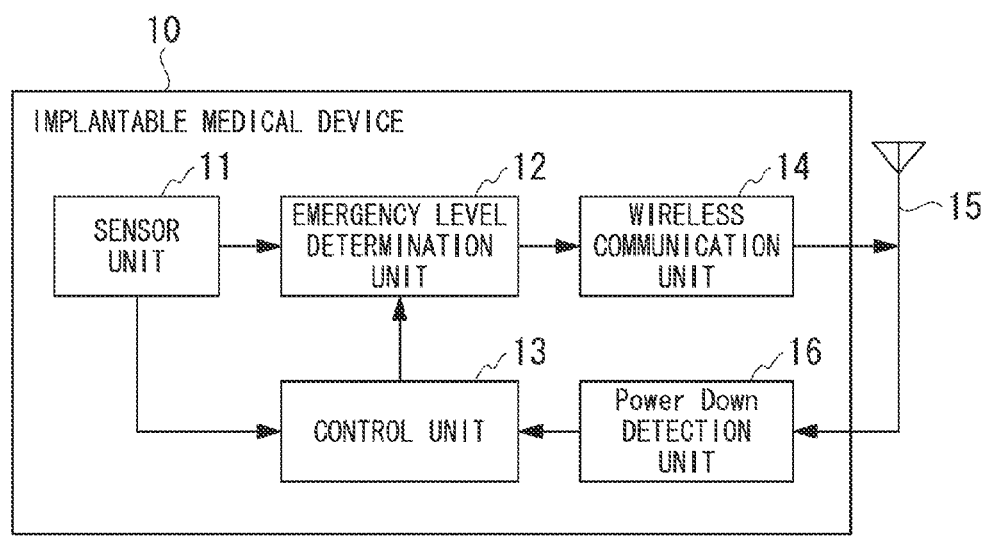
FIG. 2 is a block diagram illustrating the configuration of the IMD 10 in accordance with the first preferred embodiment of the present invention.

Next, the configuration of the IMD 10 will be described. FIG. 2 is a block diagram illustrating the configuration of the IMD 10 in accordance with the first preferred embodiment of the present invention. In the example illustrated in FIG. 2, the IMD 10 includes a sensor unit 11, an emergency level determination unit 12, a control unit 13, a wireless communication unit 14, an antenna 15, and a Power Down detection unit 16.

The sensor unit 11 acquires the biological data, such as blood pressure, pulse, electrocardiograph, heartbeat, a blood oxygen level, body temperature, glycosuria, or blood sugar, and outputs the biological data to the emergency level determination unit 12. Furthermore, the sensor unit 11 acquires the device status data by sensing the statuses of the units provided in the IMD 10, and outputs the device status data to the emergency level determination unit 12. In addition, the sensor unit 11 has a plurality of sensing modes, and sensing intervals are different from each other according to the operation mode of the IMD 10. In detail, when the operation mode of the IMD 10 is the normal mode, the sensor unit 11 acquires the detailed data every minute. Furthermore, when the operation mode of the IMD 10 is the emergency mode, the sensor unit 11 acquires the detailed data every 10 seconds.

When an event (abnormality of the biological data or abnormality of the device status data) has occurred, the emergency level determination unit 12 detects the event based on the detailed data input from the sensor unit 11. Furthermore, when the event has been detected, the emergency level determination unit 12 determines whether to change the operation mode of the IMD 10 from the normal mode to the emergency mode. For example, when the detected event is a mild event, the emergency level determination unit 12 determines that the operation mode of the IMD 10 is not changed to the emergency mode. When the detected event is a severe event, the emergency level determination unit 12 determines that the operation mode of the IMD 10 is changed to the emergency mode. Furthermore, when the IMD 10 operates in the emergency mode, the emergency level determination unit 12 outputs the detailed data input from the sensor unit 11 to the wireless communication unit 14.

The control unit 13 controls the units provided in the IMD 10 such that the IMD 10 performs an operation corresponding to the operation mode. In detail, when the emergency level determination unit 12 has determined that the operation mode is changed to the emergency mode, the control unit 13 changes the operation mode of the IMD 10 to the emergency mode, and activates the wireless communication unit 14. Then, the control unit 13 controls the wireless communication unit 14 to transmit the RF Wake UP signal to the wireless communication terminal 20. Furthermore, when the measurement mode change signal is received from the wireless communication terminal 20, the control unit 13 changes the operation mode of the IMD 10 from the emergency mode to the normal mode. Furthermore, when the Power Down signal has been input from the Power Down detection unit 16, the control unit 13 stops the operation of the wireless communication unit 14.

When the IMD 10 operates in the emergency mode, the wireless communication unit 14 wirelessly transmits the detailed data input from the emergency level determination unit 12 to the wireless communication terminal 20 through the antenna 15. Furthermore, the wireless communication unit 14 receives the measurement mode change signal (control data) serving as an instruction to change the operation mode of the IMD 10 from the emergency mode to the normal mode from the wireless communication terminal 20 through the antenna 15. The Power Down detection unit 16 receives (detects) the Power Down signal transmitted from the wireless communication terminal 20. Furthermore, when the Power Down signal has been received, the Power Down detection unit 16 outputs the received Power Down signal to the control unit 13.

In addition, a control unit according to a claim, for example, corresponds to the emergency level determination unit 12 and the control unit 13.

Figure 3:
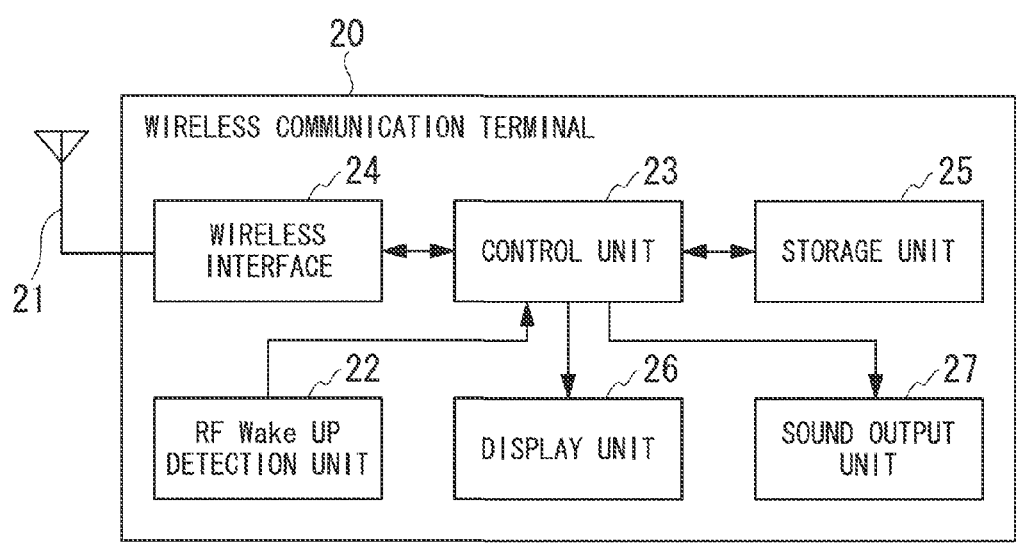
FIG. 3 is a block diagram illustrating the configuration of the wireless communication terminal 20 in accordance with the first preferred embodiment of the present invention.

Next, the configuration of the wireless communication terminal 20 will be described. FIG. 3 is a block diagram illustrating the configuration of the wireless communication terminal 20 in accordance with the first preferred embodiment of the present invention. In the illustrated example, the wireless communication terminal 20 includes an antenna 21, an RF Wake UP detection unit 22, a control unit 23, a wireless interface 24, a storage unit 25, a display unit 26, and a sound output unit 27.

The RF Wake UP detection unit 22 receives an RF Wake UP signal transmitted from the IMD 10 through the antenna 21. Furthermore, when the RF Wake UP signal has been received, the RF Wake UP detection unit 22 outputs the received RF Wake UP signal to the control unit 23.

The control unit 23 controls the units provided in the wireless communication terminal 20. Furthermore, when the RF Wake UP signal has been input from the RF Wake UP detection unit 22, the control unit 23 activates the wireless interface 24. Furthermore, the control unit 23 performs a schematic determination process of determining whether to change the operation mode of the IMD 10 from the emergency mode to the normal mode, based on the detailed data input from the wireless interface 24. Then, when it is determined that the operation mode of the IMD 10 is changed from the emergency mode to the normal mode, the wireless communication terminal 20 controls the wireless interface 24 to transmit the data measurement mode change signal for instructing a change from the emergency mode to the normal mode to the IMD 10.

Furthermore, when it is determined that the operation mode of the IMD 10 is changed from the emergency mode to the normal mode, the wireless communication terminal 20 controls the wireless interface 24 to transmit the Power Down signal to the IMD 10, wherein the Power Down signal instructs to stop the operation of the wireless communication unit 14 of the IMD 10.

Furthermore, the control unit 23 controls content based on the detailed data to be displayed on the display unit 26, and controls sound based on the detailed data to be output to the sound output unit 27. For example, when the acquired detailed data is emergency data, the control unit 23 controls display data (for example, alarm information indicating that help is needed, emergency information, the state of a patient, the condition of a patient, an emergency contact number (a home contact number or a hospital contact number) and the like) stored in the storage unit 25 in advance, an electrocardiogram based on the detailed data, and the like to be displayed on the display unit 26, and controls sound data (for example, a sound signal or an alarm sound indicating that help is needed, and the like) stored in the storage unit 25 in advance to be periodically divided and output to the sound output unit 27.

If the wireless interface 24 is activated by the control unit 23, the wireless interface 24 receives the detailed data transmitted from the IMD 10 through the antenna 21, and outputs the received detailed data to the control unit 23. Furthermore, the wireless interface 24 transmits the data measurement mode change signal and the Power Down signal to the IMD 10 under the control of the control unit 23.

The storage unit 25 stores the detailed data transmitted from the IMD 10. Furthermore, the storage unit 25 stores the display data and the sound data. The display unit 26 is a display device such as a liquid crystal display (LCD), and displays content corresponding to the detailed data under the control of the control unit 23. The sound output unit 27 is a speaker and the like, and outputs sound corresponding to the detailed data under the control of the control unit 23.

Figure 4:
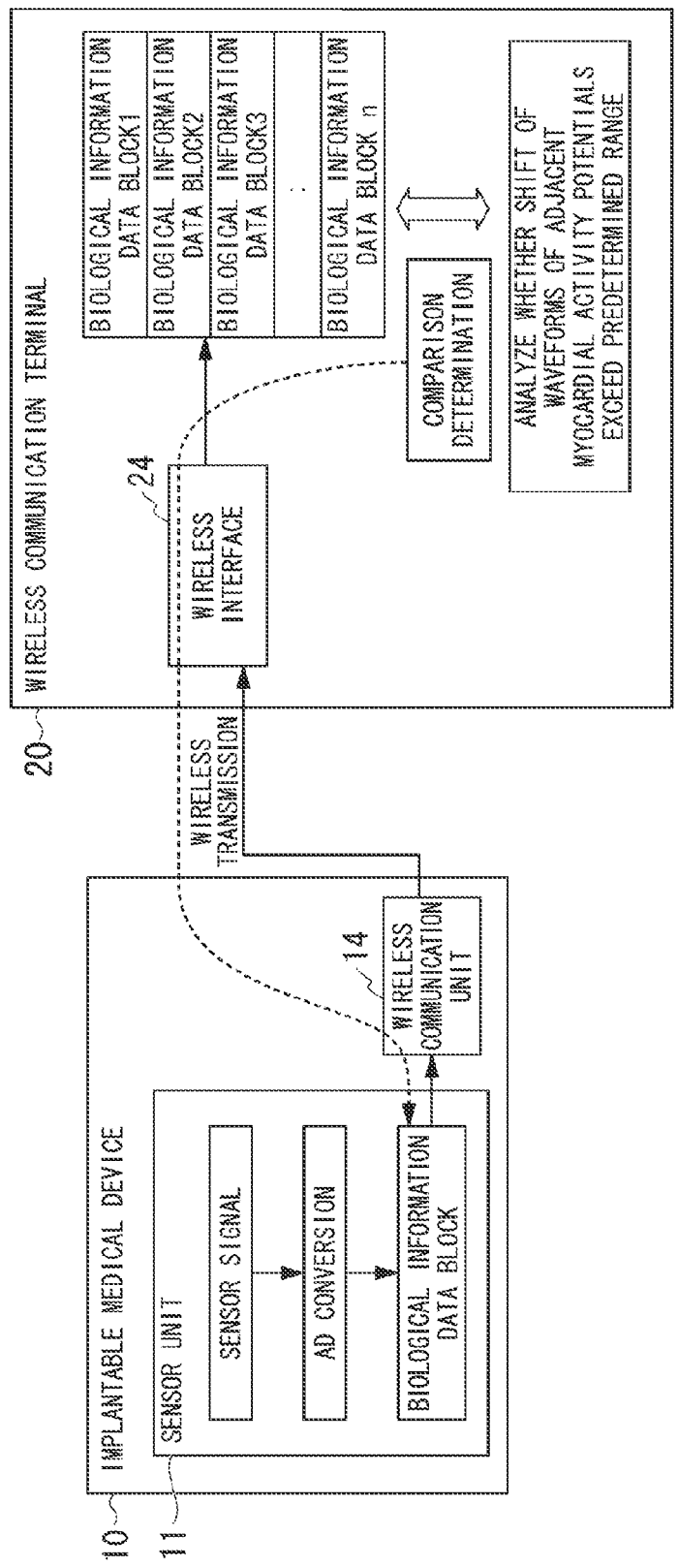
FIG. 4 is a schematic diagram illustrating data flow when the control unit 23 of the wireless communication terminal 20 in accordance with the first preferred embodiment of the present invention performs the schematic determination process.

Next, the schematic determination process will be described. FIG. 4 is a schematic diagram illustrating data flow when the control unit 23 of the wireless communication terminal 20 in accordance with the first preferred embodiment of the present invention performs the schematic determination process. In addition, according to the schematic determination process, it is determined whether to change the operation mode of the IMD 10 from the emergency mode to the normal mode, based on the detailed data transmitted from the IMD 10. A condition for a change from the emergency mode to the normal mode is established when the detailed data does not include abnormal data (when no abnormality is detected). Accordingly, the control unit 23 analyzes the detailed data, determines not to change the operation mode from the emergency mode to the normal mode when the abnormality of the detailed data is detected, and determines to change the operation mode from the emergency mode to the normal mode when no abnormality of the detailed data is detected.

Hereinafter, a description will be provided for a method in which the control unit 23 of the wireless communication terminal 20 analyzes the detailed data and detects the abnormality of the detailed data when the detailed data is a myocardial activity potential. As illustrated in FIG. 4, the sensor unit 11 of the IMD 10 performs AD conversion with respect to a myocardial activity potential acquired as an analog signal, collects a myocardial activity potential of a digital signal for a predetermined time period, and generates a biological information data block. Then, the wireless communication unit 14 of the IMD 10 transmits the biological information data block to the wireless communication terminal 20. The wireless interface 24 of the wireless communication terminal 20 receives the biological information data block transmitted from the IMD 10, and outputs the biological information data block to the control unit 23. Furthermore, the control unit 23 detects abnormality based on the biological information data block input from the wireless interface 24.

As a method of detecting the abnormality, for example, as disclosed in Japanese Unexamined Patent Application, First Publication No. 2009-247812, a method of detecting the abnormality when a shift of waveforms of adjacent myocardial activity potentials relative to a time axis continuously occurs during two or more cycles beyond a predetermined range, in order to perform prompt action when an abnormal myocardial activity potential has been generated, has been disclosed. In addition, since this method includes a cycle-based point-synchronizing algorithm which synchronizes an input myocardial activity potential with the same base point each cycle, and an overlap-displaying algorithm which simultaneously and overlappingly displays at least two cycles of waveforms of a myocardial activity potential which continues relative to a time axis, it is possible to easily detect a change in the waveforms. Furthermore, when the waveform of the myocardial activity potential has been changed beyond a predetermined range, since the method includes a wave-length-adjusting algorithm which adjusts the waveform of the myocardial activity potential after change to be the same as that of the myocardial activity potential before change, it is possible to prevent a shift of the waveform of the myocardial activity potential due to a change in the wavelength thereof from being misunderstood as an abnormal waveform.

Furthermore, in the schematic determination process, since the control unit 23 controls the sound output unit 27 to issue an alarm when the shift of waveforms of adjacent myocardial activity potentials relative to the time axis has continuously occurred during two or more cycles beyond the predetermined range, there is no false alarm due to the generation of architecture (normally, the same waveform is not continuously generated during two or more cycles) caused by body movement and the like, and it is possible to issue an alarm only when an abnormal waveform has occurred. Furthermore, when the alarm has been issued as described above, it is possible for a user to promptly cope with the abnormality of the myocardial activity potential, and to quickly determine the abnormality of a cardiovascular function which causes the above abnormality.

Next, operation procedures of the IMD 10 and the wireless communication terminal 20 in accordance with the first preferred embodiment of the present invention will be described. FIG. 5 is a sequence diagram illustrating the operation procedures of the IMD 10 and the wireless communication terminal 20 in accordance with the first preferred embodiment of the present invention.
(Step S101)
The sensor unit 11 of the IMD 10 acquires the detailed data and outputs the acquired detailed data to the emergency level determination unit 12. The emergency level determination unit 12 detects an event based on the detailed data input from the sensor unit 11.
(Step S102)
When the event has been detected, the emergency level determination unit 12 determines whether or not to change the operation mode of the IMD 10 from the normal mode to the emergency mode. Then, when the emergency level determination unit 12 has determined to change the operation mode to the emergency mode, the control unit 13 changes the operation mode of the IMD 10 to the emergency mode, and activates the wireless communication unit 14. Thereafter, the control unit 13 controls the wireless communication unit 14 to transmit the RF Wake UP signal to the wireless communication terminal 20.
(Step S103)
The RF Wake UP detection unit 22 of the wireless communication terminal 20 receives the RF Wake UP signal transmitted from the IMD 10 through the antenna 21, and outputs the received RF Wake UP signal to the control unit 23. When the RF Wake UP signal has been input from the RF Wake UP detection unit 22, the control unit 23 activates the wireless interface 24.
(Step S104)
The control unit 23 of the wireless communication terminal 20 controls the wireless interface 24 to transmit a sensing detailed data request signal to the IMD 10.
(Step S105)
The wireless communication unit 14 of the IMD 10 receives the sensing detailed data request signal transmitted from the wireless communication terminal 20.
(Step S106)
When the wireless communication unit 14 has received the sensing detailed data request signal, the control unit 13 of the IMD 10 controls the wireless communication unit 14 to transmit the detailed data detected by the sensor unit 11 to the wireless communication terminal 20.
(Step S107)
The wireless interface 24 of the wireless communication terminal 20 receives the detailed data transmitted from the IMD 10. Furthermore, the control unit 23 of the wireless communication terminal 20 performs schematic determination based on the detailed data received in the wireless interface 24, and determines whether to change the operation mode of the IMD 10 from the emergency mode to the normal mode. Furthermore, the control unit 23 of the wireless communication terminal 20 controls a determination result of the schematic determination to be displayed on the display unit 26.
(Step S108)
The control unit 23 of the wireless communication terminal 20 controls the wireless interface 24 to transmit a data measurement mode confirmation request message to the IMD 10.
(Step S109)
The wireless communication unit 14 of the IMD 10 receives the data measurement mode confirmation request message transmitted from the wireless communication terminal 20.
(Step S110)
The control unit 13 of the IMD 10 controls the wireless communication unit 14 to transmit a data measurement mode signal indicating a current operation mode to the wireless communication terminal 20.

(Step S111)

The wireless interface 24 of the wireless communication terminal 20 receives the data measurement mode signal transmitted from the IMD 10.

(Step S112)

When an operation mode specified by the data measurement mode signal received in step S111 is the emergency mode and it is determined that the operation mode of the IMD 10 is changed from the emergency mode to the normal mode in the process of step S107, the control unit 23 of the wireless communication terminal 20 transmits the data measurement mode change signal to the IMD 10, wherein the data measurement mode change signal instructs changing in the operation mode of the IMD 10 from the emergency mode to the normal mode.

(Step S113)

The wireless communication unit 14 of the IMD 10 receives the data measurement mode change signal transmitted from the wireless communication terminal 20.

(Step S114)

When the wireless communication unit 14 has received the data measurement mode change signal, the control unit 13 of the IMD 10 changes the operation mode from the emergency mode to the normal mode, and performs a process corresponding to the normal mode. Furthermore, the control unit 13 controls the wireless communication unit 14 to transmit a measurement mode change confirmation signal to the wireless communication terminal 20, wherein the measurement mode change confirmation signal indicates that the operation mode has been changed to the normal mode.

(Step S115)

The wireless interface 24 of the wireless communication terminal 20 receives the measurement mode change confirmation signal transmitted from the IMD 10.

(Step S116)

Since the operation mode of the IMD 10 has been changed to the normal mode, the control unit 23 of the wireless communication terminal 20 controls the wireless interface 24 to transmit the Power Down signal to the IMD 10.

(Step S117)

The Power Down detection unit 16 of the IMD 10 receives the Power Down signal transmitted from the wireless communication terminal 20, and outputs the received Power Down signal to the control unit 13. When the Power Down signal has been input, the control unit 13 of the IMD 10 stops the operation of the wireless communication unit 14.

Next, the operation procedure of the IMD 10 will be described. FIG. 6 is a flowchart illustrating the operation procedure of the IMD 10 in accordance with the first preferred embodiment of the present invention.

(Step S201)

The sensor unit 11 acquires the detailed data and outputs the acquired detailed data to the emergency level determination unit 12. The emergency level determination unit 12 detects an event based on the detailed data input from the sensor unit 11. Furthermore, when the event has been detected, the emergency level determination unit 12 determines whether or not to switch the operation mode of the IMD 10 from the normal mode to the emergency mode. Then, when the emergency level determination unit 12 has determined to switch the operation mode to the emergency mode, the control unit 13 switches the operation mode of the IMD 10 to the emergency mode, and activates the wireless communication unit 14. Thereafter, the control unit 13 proceeds to a process of step S202.

(Step S202)

The control unit 13 controls the wireless communication unit 14 to transmit the RF Wake UP signal to the wireless communication terminal 20. Thereafter, the control unit 13 proceeds to a process of step S203.

(Step S203)

When the wireless communication unit 14 has received the sensing detailed data request signal, the control unit 13 controls the wireless communication unit 14 to transmit the detailed data detected by the sensor unit 11 to the wireless communication terminal 20. Thereafter, the control unit 13 proceeds to a process of step S204.

(Step S204)

When the wireless communication unit 14 has received the data measurement mode confirmation request message, the control unit 13 controls the wireless communication unit 14 to transmit the data measurement mode signal indicating a current data measurement mode state to the wireless communication terminal 20. Thereafter, the control unit 13 proceeds to a process of step S205.

(Step S205)

When the wireless communication unit 14 has received the data measurement mode change signal, the control unit 13 changes the operation mode from the emergency mode to the normal mode, and performs a process corresponding to the normal mode. Furthermore, the control unit 13 controls the wireless communication unit 14 to transmit the measurement mode change confirmation signal to the wireless communication terminal 20, wherein the measurement mode change confirmation signal indicates that the operation mode has been changed to the normal mode. Thereafter, the control unit 13 proceeds to a process of step S206.

(Step S206)

When the Power Down detection unit 16 has received the Power Down signal, the control unit 13 stops the operation of the wireless communication unit 14. Thereafter, the operation procedure is ended.

Next, the operation procedure of the wireless communication terminal 20 will be described. FIG. 7 is a flowchart illustrating the operation procedure of the wireless communication terminal 20 in accordance with the first preferred embodiment of the present invention.

(Step S301)

When the RF Wake UP detection unit 22 has received the RF Wake UP signal, the control unit 23 activates the wireless interface 24. Thereafter, the control unit 23 proceeds to a process of step S302.

(Step S302)

The control unit 23 controls the wireless interface 24 to transmit the sensing detailed data request signal to the IMD 10. Thereafter, the control unit 23 proceeds to a process of step S303.

(Step S303)

When the wireless interface 24 has received the detailed data, the control unit 23 performs the schematic determination based on the detailed data, and determines whether or not to change the operation mode of the IMD 10 from the emergency mode to the normal mode. Furthermore, the control unit 23 controls a determination result of the schematic determination to be displayed on the display unit 26. Thereafter, the control unit 23 proceeds to a process of step S304.

(Step S304)

The control unit 23 controls the wireless interface 24 to transmit the data measurement mode confirmation request message to the IMD 10. Thereafter, the control unit 23 proceeds to a process of step S305.

(Step S305)

When the wireless interface 24 has received the data measurement mode signal, if an operation mode specified by the received data measurement mode signal is the emergency mode and it is determined that the operation mode of the IMD 10 is changed from the emergency mode to the normal mode in the process of step S303, the control unit 23 transmits the data measurement mode change signal to the IMD 10, wherein the data measurement mode change signal instructs changing in the operation mode of the IMD 10 from the emergency mode to the normal mode. Thereafter, the control unit 23 proceeds to a process of step S306.

(Step S306)

When the wireless interface 24 has received the measurement mode change confirmation signal, the control unit 23 controls the wireless interface 24 to transmit the Power Down signal to the IMD 10. Thereafter, the operation procedure is ended.

As described above, according to the first preferred embodiment of the present invention, the IMD 10 operates in one of two modes, that is, the normal mode in which a data acquisition interval is long, and the emergency mode in which the data acquisition interval is short. Determination of switching from the normal mode to the emergency mode is performed by the IMD 10. Thus, for example, when the IMD 10 has detected an emergency event, since the IMD 10 performs the determination of the switching from the normal mode to the emergency mode, it is possible to switch the operation mode to the emergency mode more quickly, as compared with the case in which the wireless communication terminal 20 performs the determination of the switching from the normal mode to the emergency mode.

Furthermore, according to the first preferred embodiment of the present invention, determination of switching of the operation mode of the IMD 10 from the emergency mode to the normal mode is performed by the wireless communication terminal 20. Thus, since the IMD 10 does not need to perform the determination of the switching from the emergency mode to the normal mode, it is possible to further reduce the consumption of a battery provided in the IMD 10.

Furthermore, according to the first preferred embodiment of the present invention, when it is determined that the operation mode of the IMD 10 is switched from the emergency mode to the normal mode, the wireless communication terminal 20 transmits the Power Down signal to the IMD 10. Furthermore, when the Power Down signal has been received, the IMD 10 stops the operation of the wireless communication unit 14. Thus, when the detailed data is not transmitted to the wireless communication terminal 20, it is possible for the IMD 10 to stop the wireless communication unit 14, so that it is possible to further reduce the consumption of a battery provided in the IMD 10.

While preferred embodiments of the present invention have been described and illustrated above, it should be understood that these are examples of the present invention and are not to be considered as limiting. Additions, omissions, substitutions, and other modifications can be made without departing from the scope of the present invention.

For example, the IMD 10 and the wireless communication terminal 20 in the above-mentioned preferred embodiment wirelessly communicate with each other in a one-to-one manner. However, the present invention is not limited thereto. For example, the IMD 10 and the wireless communication terminal 20 may wirelessly communicate with each other in a multi-to-multi manner.

Accordingly, the present invention is not to be considered as being limited by the foregoing description, and is only limited by the scope of the claims.

What is claimed is:

1. A sensing wireless terminal comprising:
a sensor unit having at least two sensing modes;
a wireless communication unit configured to wirelessly transmit sensing data corresponding to a signal sensed by the sensor unit to another terminal, the wireless communication unit receiving control data transmitted from the other terminal; and
a control unit configured to determine whether or not to change a mode from a first mode to a second mode based on the signal sensed by the sensor unit, the control unit determining whether or not to change the mode from the second mode to the first mode based on the control data received by the wireless communication unit, wherein, comparing the two sensing modes of the sensor unit, a mode having a relatively long sensing interval is defined as the first mode and a mode having a relatively short sensing interval is defined as the second mode.

2. The sensing wireless terminal according to claim 1, wherein, if it is determined that the mode is changed from the first mode to the second mode, then the control unit controls the wireless communication unit to transmit a signal to the other terminal, wherein the signal activates a communication unit provided in the other terminal.

3. A sensing method by using a sensing wireless terminal including a sensor unit, the sensing method comprising:
a step of sensing, by the sensor unit, with a first mode or a second mode, wherein a mode having a relatively long sensing interval is defined as the first mode and a mode having a relatively short sensing interval is defined as the second mode;
a step of wirelessly transmitting sensing data corresponding to a signal sensed by the sensor unit to another terminal, and receiving control data transmitted from the other terminal; and
a step of determining whether or not to change a mode from a first mode to a second mode based on the signal sensed by the sensor unit, and determining whether or not to change the mode from the second mode to the first mode based on the control data that has been received.

4. A sensing system including a sensing wireless terminal and a terminal for receiving sensing data from the sensing wireless terminal, wherein
the sensing wireless terminal comprises:
a sensor unit having at least two sensing modes;
a first wireless communication unit configured to wirelessly transmit sensing data corresponding to a signal sensed by the sensor unit to another terminal, the first wireless communication unit receiving control data transmitted from the other terminal; and
a control unit configured to determine whether or not to change a mode from a first mode to a second mode based on the signal sensed by the sensor unit, the control unit determining whether or not to change the mode from the second mode to the first mode based on the control data received by a second wireless communication unit, wherein, comparing the two sensing modes of the sensor unit, a mode having a relatively long sensing interval is defined as the first mode and a mode having a relatively short sensing interval is defined as the second mode, and
the terminal comprises:
the second wireless communication unit configured to wirelessly receive the sensing data from the sensing wireless terminal, the second wireless communication unit transmitting the control data to the sensing wireless terminal.

* * * * *